Jan. 25, 1944. C. W. NYSEWANDER 2,339,874
BALANCING HYDROCARBON CONVERSION
Filed Jan. 31, 1941
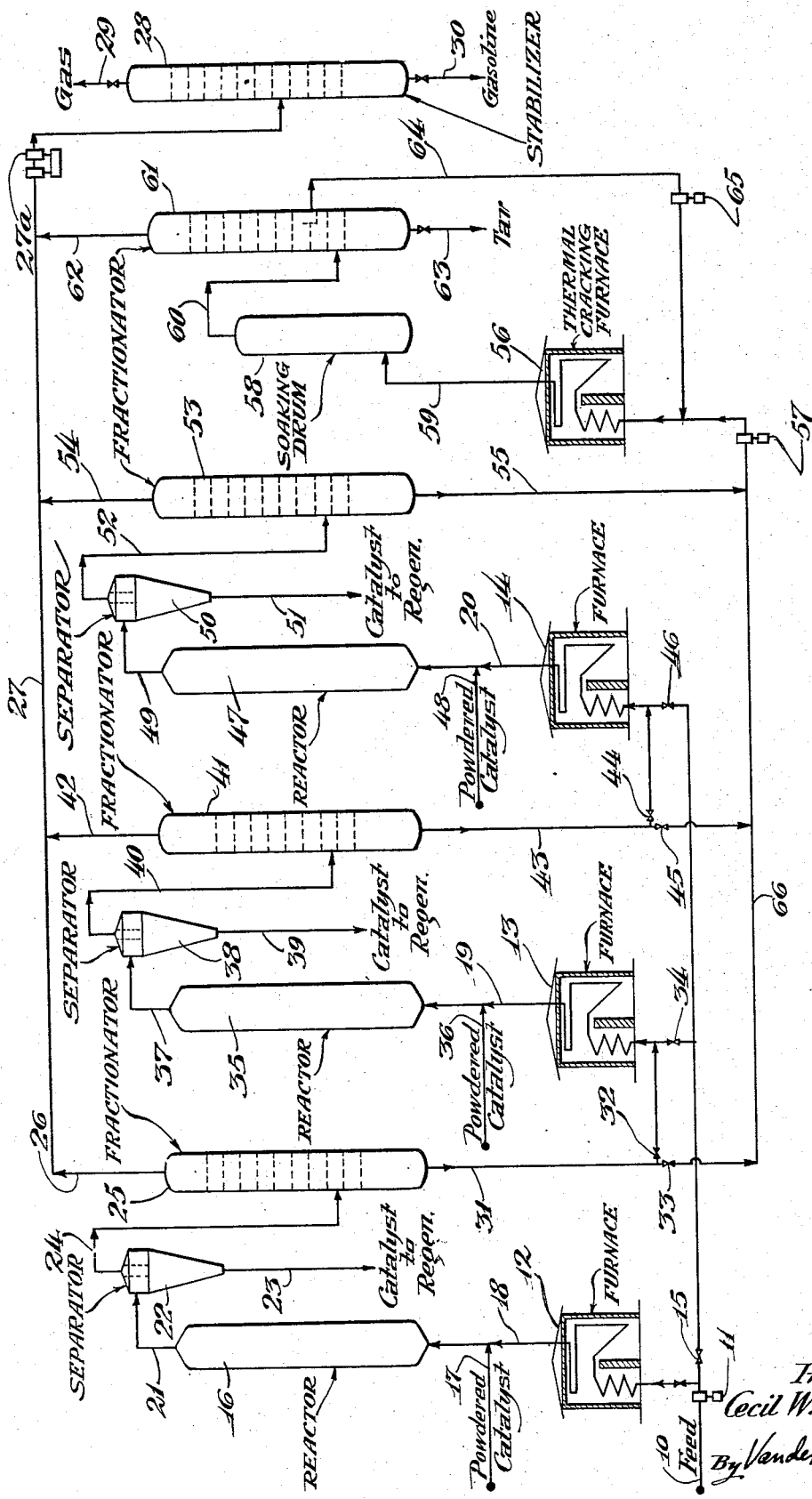

Patented Jan. 25, 1944

2,339,874

UNITED STATES PATENT OFFICE 2,339,874

BALANCING HYDROCARBON CONVERSION

Cecil W. Nysewander, Highland, Ind., assignor to Standard Oil Company, Chicago, Ill., a corporation of Indiana Application January 31, 1941, Serial No. 376,792

2 Claims. (Cl. 196—52)

This invention relates to the catalytic conversion of hydrocarbon oils and particularly the conversion of gas oils into high knock rating gasoline by the action of solid, heterogeneous catalysts on the gas oil vapors at elevated conversion temperature. The invention also relates to a combination of catalytic and non-catalytic thermal conversion operations to produce gasolines of certain desired specifications.

One object of the invention is to provide a flexible process for converting heavy oils into gasoline with different distillation and antiknock characteristics whenever desired. Another object of the invention is to provide a process and apparatus for producing in addition to gasoline certain of the lighter hydrocarbons desirable in gasoline for winter use, particularly the butanes and pentanes. The terms "butanes" and "pentanes" used herein will be understood to include the unsaturated hydrocarbons corresponding thereto, i. e., the butylenes and pentylenes, respectively.

The invention is illustrated by a drawing which forms a part of this specification and which shows diagrammatically the layout for a plant designed to carry out the process.

Referring to the drawing: the charging stock which may be Mid-Continent gas oil, for example of 32.2° A. P. I., is introduced at 10 and forced by pump 11 to one or more of the pipe heating furnaces 12, 13 and 14. Two principal methods of operation are employed which will be designated as series flow and parallel flow. The series flow operation is employed where a high yield of gasoline is desired having average volatility. Parallel flow operation is employed where a gasoline of high volatility is required or where it is desired to produce butanes and pentanes in addition to gasoline.

Series flow

Describing the series flow operation first: the charging stock is passed through furnace 12, valve 15 being closed. The oil is vaporized and the vapors are heated to the desired conversion temperature, usually between 850 and 1050° F. For most stocks a temperature in the range of 900 to 950° F. is satisfactory. Oil vapors leaving the furnace at a temperature within the range of 900 to 950° F. are contacted at such temperature in reactor 16 with powdered catalyst introduced by line 17 and dispersed in the vapor stream. The catalyst is a porous, refractory, solid material, generally of siliceous nature. It may be in any suitable state of subdivision, for example, in the form of a fine powder or a granular mass of varying particle size. Thus, it may have a screen size of 10 mesh to 300 or 400 mesh, depending on the type of apparatus employed and the mode of contacting. Usually a screen size of 40 to 200 mesh is convenient.

The catalysts are inorganic substances, usually oxides, for example, silica, alumina, magnesia, and in general the oxides of the metals of Groups II to VI of the Periodic Table. For use in cracking, mixed oxides are commonly employed, such as alumina deposited on active silica, and various combinations of alumina, zirconia, magnesia and silica. Co-precipitated alumina on silica or magnesia on silica are suitable and silica gels prepared in various ways may be employed, generally activated with alumina or other metals including cobalt and nickel. Natural clays, acid treated bentonite, fuller's earth, etc. may also be employed. The catalyst is generally dehydrated by ignition and it is preferable to preheat the catalyst before introducing it into the oil stream. Various means may be employed for feeding the catalyst at the desired rate, for example, screw pumps, star feeders and other types of automatic feeders may be used. The catalyst may be supplied under pressure from a tower or standpipe, not shown, in order to overcome the back pressure of the vapors in the transfer lines 18, 19 and 20, and assure a constant, steady introduction of catalyst to the stream of oil vapors.

Returning now to the drawing, the mixture of vapors and catalyst, containing for example about 1 to 10 pounds of catalyst per pound of vapors, passes through line 18 into reactor 16 where sufficient time of contact is provided to effect the desired conversion, usually about 20 to 50% of the oil charged. The catalyst is maintained in the reactor for a longer period of time than the vapors due to the phenomena of sedimentation and hindered settling. This is called the catalyst residence time. It may be varied by varying the velocity of the vapors passing upward through the reactor, the lower the velocity, the longer the catalyst residence time. Catalyst residence times of ½ to 10 minutes are suitable with suspended catalysts.

Spent catalyst and vapors pass by line 21 to centrifugal separating device 22 where most of the catalyst is separated from the vapors and falls to the discharge line 23. Vapors substantially free of catalyst pass by line 24 to fractionator 25 where gasoline and lighter hydrocarbons are removed through vapor line 26. The gasoline vapors are thence conducted by manifold 27 to stabilizer 28 where the gasoline is separated from the undesired gases particularly propane and lighter gases. The stabilizer 28 is preferably operated at an elevated pressure, usually about 200 pounds per square inch which may be obtained by means of compressor 27a. In general, it is preferred to condense the gasoline from line 27 and compress only the uncondensed gases in which case the gasoline may be charged by a simple liquid pump. A reboiling coil at the bottom of stabilizer 28 and a reflux coil at the top, not shown, provide the necessary heat and cooling for fractionation. Gases are removed from the stabilizer by line 29 and the gasoline is withdrawn by line 30. The gases in 29 may also contain butane which is in excess of that needed in the gasoline, and this butane may be recovered later.

Unconverted heavy hydrocarbons are withdrawn from the base of fractionator 26 by line 31 and are passed through valve 32 to heater 13, valves 33 and 34 being closed. In heater 13 the oil containing in suspension any fine catalyst which may not have been separated in 22 is heated again to a high conversion temperature, for example about 950° F., and the vapors are conducted by transfer line 19 to reactor 35. Additional catalyst is introduced by line 36, the ratio of catalyst added to oil charged being kept about the same as that in reactor 16. If desired, however, an increased proportion of catalyst may be added at 36 and the catalyst may also be of a more active type. For example, a fresher catalyst may be employed for the stock in line 19 than that employed for the stock in line 18.

Conversion of the hydrocarbons is effected in reactor 35 and the spent catalyst and converted vapors are conducted by line 37 leading to cyclone separator 38 where the catalyst is separated from the vapors and discharged by line 39. The vapors are conducted by line 40 to fractionator 41 where gasoline and lighter hydrocarbons are separated and discharged by line 42 leading to manifold 27 and stabilizer 28. Heavier hydrocarbon oils are conducted by line 43 to heater 14, valve 44 being open and valves 45 and 46 being closed. The oil is vaporized and the vapors are conducted at high temperature, for example, 975° F. through transfer line 20 to reactor 47. Additional catalyst is introduced from line 48, the ratio of catalyst to oil being the same or greater than that employed in lines 18 and 19. As in the case of the stock in line 19, the catalyst added at 48 may have a still higher catalytic activity in order to more effectively convert the more refractory stock in line 20.

As indicated, when operating the catalytic contacting zones 16, 35 and 47 in series, it may be desirable to progressively increase the severity of the reaction conditions. Increase in severity of conditions may be obtained by increasing the activity of the catalyst as indicated, by increasing the amount of the catalyst, i. e., the catalyst to oil ratio, by increasing the temperature or by reducing the space velocity. The space velocity is the volume of liquid oil charged per hour per volume of catalyst in the contacting zone. Where the catalyst is in a fixed bed or moving bed the apparent volume of the catalyst is usually employed in calculating the space velocity. Where the catalyst is in the form of a powder the corresponding volume of the catalyst may be determined from its weight and density. In general a space velocity of about 1 is satisfactory. Space velocities of 0.1 to 3 or even as high as 6 or 10 may be used, however.

After the desired reaction has taken place in reactor 47 the hydrocarbon vapors and suspended spent catalyst pass by line 49 to separator 50 wherein the catalyst is separated and discharged by line 51. The vapors are conducted by line 52 to fractionator 53 where gasoline and lighter hydrocarbons are separated and withdrawn by line 54 leading to manifold 27 and stabilizer 28.

Heavy hydrocarbons are withdrawn at the base of fractionator 53 and are conducted by line 55 to heater 56 where the vapors are again heated to conversion temperature, e. g., 900 to 975° F. The pressure is also suitably increased at this point by pump 57. The pressure in the catalytic reactors 16, 35 and 47 is generally quite low of the order of 5 to 25 pounds per square inch or as high as 50 pounds per square inch, and the pressure may be increased by pump 57 to 100 to 1000 pounds per square inch, preferably about 750 pounds per square inch, in heater 56 and the subsequent reaction chamber or soaking drum 58. The vapors are conducted from furnace 56 by line 59 leading to soaking drum 58 where further non-catalytic conversion of the oil takes place. Vapors from the soaking drum 58 pass by vapor line 60 to fractionator 61 where gasoline and lighter hydrocarbons are withdrawn by vapor line 62 leading to manifold 27 and stabilizer 28. Heavy, substantially unvaporizable products are withdrawn by tar line 63 while a heavy cycle oil fraction boiling above the desired gasoline boiling range is trapped out and recycled by line 64 through pump 65 and back to heater 56. In this manner the heavy vaporizable fractions are recycled to completion, the only products eliminated being the tar at 63 and gasoline and gas.

The following data will illustrate the series operation just described. A virgin 32.2° A. P. I. Mid-Continent gas oil was charged by line 10. The catalyst was an acid activated, bentonite clay and the catalytic conversion temperature was 900° F. throughout. In the first pass 24.6% of the charge was converted, at a space velocity of 4, into gasoline having a Reid vapor pressure of 10 pounds. In the second pass the yield was increased to 37% and in the third pass through reactor 47 the yield was increased to 46.7%. Thermal cracking of the residue from reactor 47 was carried out at 750 pounds per square inch and 975° F. It yielded an additional 36.2% of gasoline based on the original charging stock making a total gasoline yield of 82.9%. Only 1.4% of additional butane was produced above that contained in the gasoline. The knock rating of the total gasoline produced was 72.2 C. F. R.—motor method. The dry gas produced was 9.8% by weight of the charging stock. In addition, 13.5% of tar suitable for fuel oil was produced and discharged by line 63.

*Parallel flow*

In the parallel flow operation, valves 15, 33, 34, 45 and 46 are open while valves 32 and 44 are closed. Feed stock introduced by pump 11 is divided substantially in proportion to the reactor volume and charged into furnaces 12, 13 and 14 in parallel. It is passed with catalysts through reactors 16, 35 and 47 substantially as in the series operation except that in this case identical conditions will usually be employed in each reactor with respect to temperature and catalyst to oil ratio. The heavy stock separated at the bottom of fractionators 26, 41 and 53 is conducted by lines 31, 43 and 55 to manifold 66 leading to pump 57 by which it is charged to thermal cracking furnace 56. The oil is then cracked in soaking drum 58 under conditions similar to those previously described except that somewhat lower temperatures may be employed if desired. The heavy recycle stock is returned to the furnace by line 64 and pump 65 as before until the oil is completely converted into gasoline, gas and tar.

As an example of this type of operation the following data were obtained: charging the same stock by line 19 at the same temperature, i. e., 900° F., there was produced by catalytic cracking in reactors 16, 35 and 47 46.3% of gasoline. A space velocity of 0.73 was employed to obtain this conversion. Thermal cracking of the heavy products in furnace 56 and drum 58 produced an additional 31.1% of gasoline, making a total yield of 77.4% of gasoline on the gas oil charged to the process. In addition, there was produced 7.5% of excess butane, 13.6% of tar, and 9.7% of dry gas. The knock rating of the gasoline was 73.9 compared with 72.2 produced by the series method.

The significant difference between the two methods, series and parallel, lies in the product distribution of the gasoline which may be indicated most conveniently by the distillation range shown in the following table:

|  | Series | Parallel |
|---|---|---|
| Total gasoline yield, vol. per cent of charge per cent | 82.9 | 77.4 |
| Reid vapor pressure of the above gasoline pounds | 10 | 10 |
| Excess butane | 1.4 | 7.5 |
| Reid vapor pressure of gasoline including all butanes | 11.2 | 16.2 |
| A. S. T. M. distillation of the 10 lb. R. V. P. gasoline: Per cent off at— |  |  |
| 158° F | 23.0 | 29.5 |
| 221° F | 39.5 | 50.0 |
| 284° F | 63.0 | 68.0 |
| 302° F | 68.0 | 73.0 |
| 356° F | 88.0 | 88.0 |
| 374° F | 92.5 | 92.0 |
| 392° F | 97.0 | 98.0 |
| 400° F | 100 | 100.0 |

In carrying out my process, I may use suspended powdered catalyst as described or I may employ a fixed bed type of catalytic operation in which the catalyst in granular form, for example ¼ inch to 40 mesh granules, is packed in the reactors where the vapors pass through, usually in a downward direction. A moving bed operation may also be used, fresh catalyst being continually or intermittently charged at the top and discharged at the bottom of the bed. The data in the examples just given were obtained by such a moving bed type of operation. When employing a stationary bed it is desirable to regenerate the catalyst at intervals by diverting the flow of hydrocarbon vapors to a fresh catalyst drum and blowing air through the spent catalyst to restore its activity at intervals, usually of 20 minutes to 2 hours' duration. Where moving bed or granular catalyst is employed, the catalyst is continuously or intermittently introduced into the top of the reaction chamber and flows downwardly to the outlet where it is withdrawn and regenerated in a separate apparatus by blowing with air, the regenerated catalyst being returned to the reactor inlet.

In suspended catalyst operation illustrated in the drawing the catalyst which is removed by the separators 22, 38 and 58 is conducted by lines 23, 39 and 51 to a regenerator not shown. A suitable regenerator for suspended catalysts consists usually of a vertically elongated drum into which the catalyst is introduced at the bottom with air or other oxidizing gas, for example a mixture of air and flue gas and the carbonaceous matter is burned from the catalyst particles while they pass upwardly through the drum, care being taken to control the temperature to prevent its rising above the point at which the catalyst will be injured. A temperature of 1000 to 1200° F. is usually satisfactory and certain catalysts may be regenerated at somewhat higher temperatures, e. g., 1400 to 1600° F. The regenerated catalyst, preferably while still hot from the regenerator, is returned to the inlet of the reactors and dispersed in the hydrocarbon oil vapors as previously described.

In the series operation, it may be desirable to employ a separate regenerator for each stage and feed the fresh catalyst to the third or last stage of the series, thereby contacting the most refractory stock with the most active catalyst. Make-up catalyst for the earlier stages of the system may be obtained by advancing the catalyst successively from the later stages of the system. In general, however, I prefer to combine all spent catalyst from 23, 39 and 51 and regenerate it in a single apparatus, thereafter distributing the regenerated catalyst to the separate stages of the system.

It will be observed from the foregoing data that my process and apparatus provide a means for making a gasoline of low volatility or high volatility as desired from the same charging stock and under substantially the same conditions by simply altering the flow of the oil through the process. In addition to making high volatility gasoline the parallel flow operation also produces an excess of butane which is sometimes desired for blending with other gasoline stocks of insufficient volatility. The excess butane may also be stored separately and employed in blending winter gasolines. The adaptability of my process enables the refiner to change quickly from the manufacture of low volatility summer gasolines to high volatility winter gasolines when desired and vice versa. By the use of my process the refiner is not required to carry over large stocks of high volatility gasoline from the summer season to the winter season because the desired volatility can be made currently by simply shifting the process from series operation to parallel operation.

Although I have described my invention with respect to certain applications thereof, it should be understood that it is intended to be limited only by the following claims. Thus I may employ various modifications such as conducting the catalytic cracking operations in the presence of hydrogen and/or recycle gases added to the charging stock. Other modifications will be apparent to those skilled in the art.

I claim:

1. The process of catalytically converting heavy hydrocarbon oils into gasoline in a system employing a plurality of catalytic reaction stages which comprises operating said stages in series for a selected period of time by contacting the vapors of said oils at conversion temperature with a refractory, solid finely divided, suspended cracking catalyst, thereby effecting a partial conversion of the heavy oils into gasoline, separating hydrocarbon vapors from catalyst, fractionating said vapors to separate gasoline from unconverted oil, contacting the unconverted oil with additional powdered catalyst in a second reaction stage at conversion temperatures, separating the gasoline produced in said second reaction stage from catalyst and unconverted heavy oils, contacting said heavy oils thus produced in said second stage with additional conversion catalyst suspension in a third reaction stage, separating the gasoline from catalyst and heavier products of said third reaction stage, subjecting the heavy products from said third reaction stage to thermal conversion with recycling to completion, and blending gasoline from said thermal conversion with gasoline produced in said catalytic conversion operations, to produce said gasoline of relatively low volatility, and periodically operating said catalytic conversion stages in parallel to produce gasoline of relatively high volatility by directly charging each of said catalytic stages with said heavy hydrocarbon oil, separating catalyst and fractionating the products after each stage, charging the fractions heavier than gasoline from each stage to said thermal conversion step and blending gasoline fractions from the catalytic and thermal conversion operations to produce the said gasoline of relatively high volatility.

2. The process of claim 1 wherein said parallel stage conversion is conducted with substantially the same reaction temperature in each catalytic stage and the temperatures in said series catalytic conversion stages are progressively higher in the later stages.

CECIL W. NYSEWANDER.